(12) United States Patent
Kolawa et al.

(10) Patent No.: US 7,900,193 B1
(45) Date of Patent: Mar. 1, 2011

(54) SYSTEM AND METHOD FOR DETECTING DEFECTS IN A COMPUTER PROGRAM USING DATA AND CONTROL FLOW ANALYSIS

(75) Inventors: Adam K. Kolawa, Bradbury, CA (US); Marek Kucharski, Krakow (PL)

(73) Assignee: Parasoft Corporation, Monrovia, CA (US)

( * ) Notice: Subject to any disclaimer, the term of this patent is extended or adjusted under 35 U.S.C. 154(b) by 1149 days.

(21) Appl. No.: 11/557,454

(22) Filed: Nov. 7, 2006

Related U.S. Application Data

(63) Continuation of application No. 11/429,487, filed on May 4, 2006, now abandoned.

(60) Provisional application No. 60/684,537, filed on May 25, 2005.

(51) Int. Cl.
*G06F 9/44* (2006.01)

(52) U.S. Cl. .................. 717/126; 717/127; 717/128; 717/131; 717/132

(58) Field of Classification Search .................. None
See application file for complete search history.

(56) References Cited

U.S. PATENT DOCUMENTS

| | | | | |
|---|---|---|---|---|
| 5,301,325 A * | 4/1994 | Benson | ................. | 717/159 |
| 5,317,740 A * | 5/1994 | Sites | ................. | 717/129 |
| 5,339,238 A * | 8/1994 | Benson | ................. | 717/159 |
| 5,450,575 A * | 9/1995 | Sites | ................. | 717/128 |
| 5,485,616 A * | 1/1996 | Burke et al. | ................. | 717/133 |
| 5,598,560 A * | 1/1997 | Benson | ................. | 717/159 |
| 5,655,115 A * | 8/1997 | Shen et al. | ................. | 712/239 |
| 5,784,553 A * | 7/1998 | Kolawa et al. | ................. | 714/38 |
| 5,854,924 A * | 12/1998 | Rickel et al. | ................. | 717/132 |
| 5,857,097 A * | 1/1999 | Henzinger et al. | ................. | 712/236 |
| 5,950,009 A * | 9/1999 | Bortnikov et al. | ................. | 717/158 |
| 5,974,538 A * | 10/1999 | Wilmot, II | ................. | 712/218 |
| 5,978,588 A * | 11/1999 | Wallace | ................. | 717/159 |
| 6,029,002 A * | 2/2000 | Afifi et al. | ................. | 717/131 |
| 6,138,270 A * | 10/2000 | Hsu | ................. | 717/125 |
| 6,412,109 B1 * | 6/2002 | Ghosh | ................. | 717/155 |
| 6,473,794 B1 * | 10/2002 | Guheen et al. | ................. | 709/223 |
| 6,959,431 B1 * | 10/2005 | Shiels et al. | ................. | 717/124 |
| 7,089,537 B2 * | 8/2006 | Das et al. | ................. | 717/132 |
| 7,155,708 B2 * | 12/2006 | Hammes et al. | ................. | 717/155 |
| 7,299,458 B2 * | 11/2007 | Hammes | ................. | 717/133 |
| 7,349,960 B1 * | 3/2008 | Pothier et al. | ................. | 709/224 |

(Continued)

OTHER PUBLICATIONS

Title: A Tool for Efficient Protocol Validation and Testing, author: Jenny Li et al, source: IEEE, dated: Oct. 16, 2000.*

(Continued)

*Primary Examiner* — Chameli C Das
(74) *Attorney, Agent, or Firm* — Christie, Parker & Hale LLP

(57) ABSTRACT

A system and method for identifying errors in a computer software include: identifying a potential problem in the computer software; triggering a portion of the computer software by the identified potential problem; determining a control flow graph and a data flow graph for the triggered portion of the computer software originating at the identified potential problem; and analyzing the control flow graph and the data flow graph to verify that the identified potential problem is an actual error. The potential problem may be identified using test tools such as a static analysis tool or a unit test tool.

21 Claims, 13 Drawing Sheets

U.S. PATENT DOCUMENTS

| | | | | |
|---|---|---|---|---|
| 7,606,695 | B1* | 10/2009 | Nouri et al. | 703/22 |
| 7,614,044 | B2* | 11/2009 | Bhansali et al. | 717/145 |
| 2002/0062463 | A1* | 5/2002 | Hines | 714/38 |
| 2004/0088689 | A1* | 5/2004 | Hammes | 717/154 |
| 2004/0088691 | A1* | 5/2004 | Hammes et al. | 717/158 |
| 2006/0036426 | A1* | 2/2006 | Barr et al. | 703/22 |
| 2006/0080077 | A1* | 4/2006 | Johnson et al. | 703/22 |
| 2006/0111888 | A1* | 5/2006 | Hiew et al. | 703/22 |
| 2006/0195556 | A1* | 8/2006 | Shamia et al. | 709/220 |
| 2007/0168931 | A1* | 7/2007 | Martin et al. | 717/104 |
| 2007/0266366 | A1* | 11/2007 | Bucuvalas | 717/104 |

OTHER PUBLICATIONS

Title: Event_based verificatin of Synchronous, globally controlled, logic designs against signal flow graphs, author: Aelten et al, source: IEEE, dated:Aug. 6, 2002.*

Title: Method for Designing and Placing Check Sets Based on Control Flow Analysis of Programs, author: Geoghegan et al, source: IEEE, dated: Oct. 30, 1996.*

* cited by examiner

SYSTEM AND METHOD FOR DETECTING DEFECTS IN A COMPUTER PROGRAM USING DATA AND CONTROL FLOW ANALYSIS

CROSS-REFERENCE TO RELATED APPLICATION

This application is a continuation of U.S. patent application Ser. No. 11/429,487, filed May 4, 2006, now abandoned, which claims the claims the benefit of U.S. Provisional Patent Application Ser. No. 60/684,537, filed on May 25, 2005 and entitled "Detecting Defects In A Computer Program Using Data And Control Flow Analysis," the entire content of which are hereby expressly incorporated by reference.

FIELD OF THE INVENTION

The present invention relates generally to computer software testing; and more particularly to a system and method for detecting defects in a computer program using data and control flow analysis.

BACKGROUND OF THE INVENTION

In the process of developing computer programs/applications, one of the major issues is assuring appropriate levels of quality for the programs/applications. Mission critical applications require thorough testing, prior to deployment of the program/application. Applications with less reliability requirements can be built and deployed with less thorough testing. However, this causes more defects to go undetected until an end user comes across them.

On the other hand, testing effort depends on a level of complexity of the application/software under test. Even a good suit of tests driven by a human tester, covers only certain parts of the code, most of the time. In other words most of the application code is never executed in a typical scenario of manually driven testing. Testers have one or more environments in which they test the software. However, end users may have many different environments and many different applications under which a given software operates. For example, many times in an actual user environment, the software executes pieces of code which were never executed during in-house tests. This may reveal undetected defects.

To address this situation, software tests attempt to utilize measures of code coverage to cover all pieces of the code during testing process. One of such measure is line coverage or decision coverage. Line coverage counts lines of a code which were executed against all lines of the code. Decision coverage counts decisions taken during execution of decision points like, "if" statements. However, even this enhanced measure may not sufficiently cover the entire code and scenarios. Lines executed and decisions taken combined formulate execution path. One decision point with two possible decisions formulate two execution paths. But, two independent decision points with two possible decisions each formulate potentially up to 4 possible execution paths, for example, (decission1.1, decission2.1), (decission1.1, decision2.2), (decision1.2, decision2.1) and (decision1.2, decision2.2).

It is not uncommon that a defect reveals itself only on one execution path, while the rest of the execution paths remain correct. Executing each and every path in a testing environment is virtually impossible since the execution paths strongly depend, not only on UI driven actions, but also on environment, external conditions (e.g., given status of network connection), network traffic, state of a database, memory size, and the like. Emulating all such conditions is extremely time and resource consuming.

Therefore, testing is sometimes reduced to static analysis of extracted execution path. Execution paths are extracted during parsing process. Then, Control Flow Graphs (CFGs) and/or Data Flow Graphs (DFGs) are created. A code analyzer then attempts to follow the created CFGs and DFGs and detect defects. Reducing a problem to isolated, independent execution paths makes such analysis feasible. The problem with this approach is that the number of paths in a computer program is in the order of $2^N$, where N is number of lines of code, therefore, the analysis becomes impossibly compution intensive. As a result, this approach is impractical in large systems. There is a need to reduce the complexity of the analysis to a size which is in order of N to make the analysis practical for commercial systems in which N can be as large as 1,000,000 lines.

Therefore, there is a need for an efficient and thorough system and method for detecting defects in a computer program using data and control flow analysis.

SUMMARY OF THE INVENTION

In one embodiment, the present invention is a method and system for identifying errors in a computer software. The method and system identify a potential problem in the computer software; trigger a portion of the computer software by the identified potential problem; determine a control flow graph and a data flow graph for the triggered portion of the computer software originating at the identified potential problem; and analyze the control flow graph and the data flow graph to verify that the identified potential problem is an actual error.

In one embodiment, the potential problem may be identified using test tools such as a static analysis tool or a unit test tool.

In one embodiment, the present invention is a method and system for identifying errors in a computer software. The method and system trigger a portion of the computer software by a trigger; determine a control flow graph and a data flow graph for the triggered portion; execute a set of rules along the control flow graph and the data flow graph to keep track of sequence of patterns in the control flow graph and the data flow graph; and statically simulate the triggered portion.

DETAILED DESCRIPTION

Figure 1:
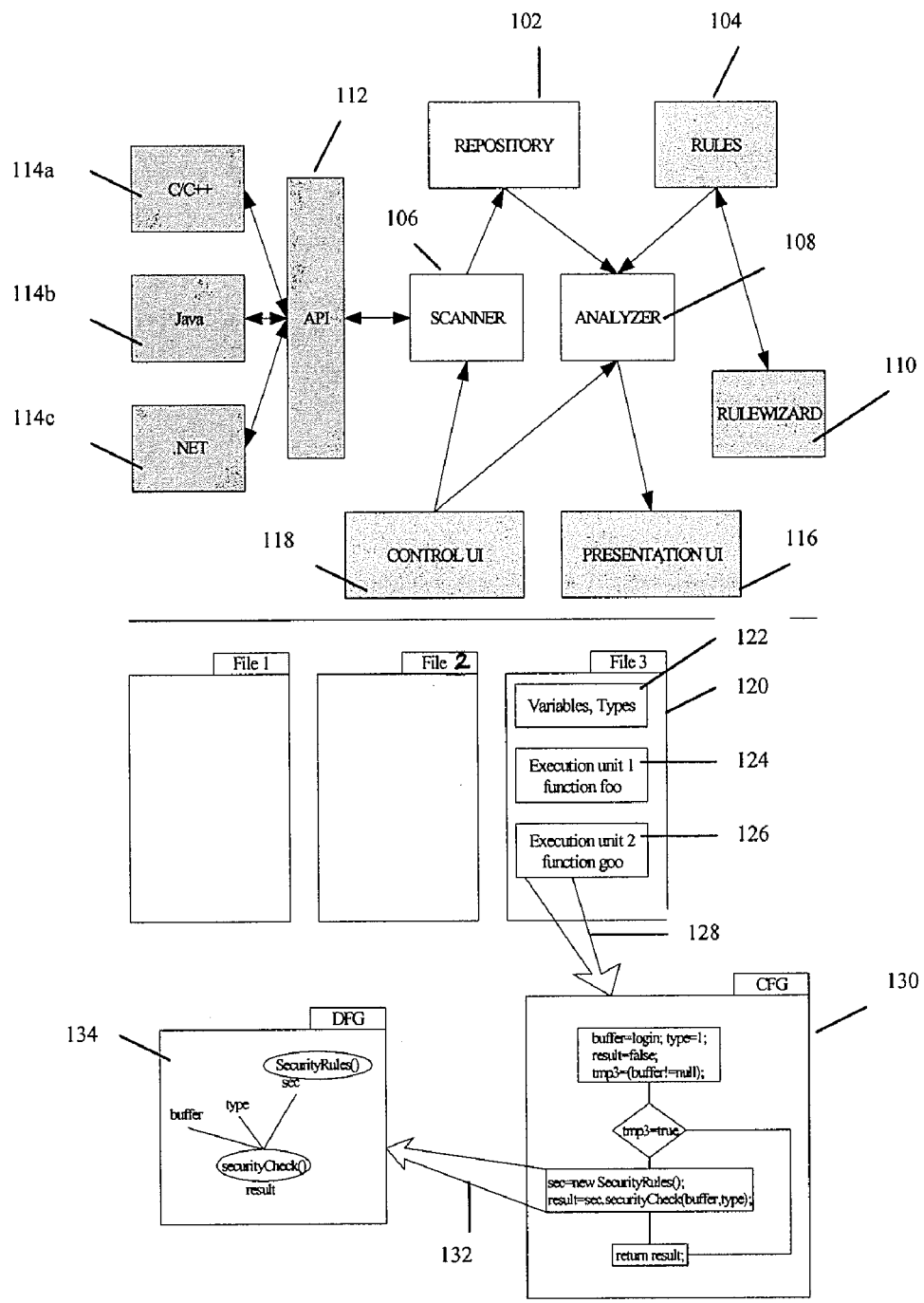
FIG. 1 is an exemplary system diagram, according to one embodiment of the present invention.

In one embodiment, the present invention is a method and system for determining computer program execution paths, storing them and efficiently analyzing them for detecting software defects. The method and system provide an Application Programming Interface (API), which allows for plugging various language specific front ends. The system also includes a storage mechanism for determined execution paths, a framework under which various concrete analysis algorithms can be used on analyzed and stored execution paths, pattern recognition based rules enforcing the process for defect detection, a set of rules that are enforced to avoid possible execution errors, and a presentation layer. The method and system also provide a mechanism to create custom rules to be enforced on detected execution paths.

In one embodiment, the present invention performs defect detection utilizing methods which trigger on potential candidates for errors and are liberal with the size of the program. These methods can be a pattern recognition engine that parses the code and performs pattern matching of the parse trees to possible error patterns. Alternatively or in addition, these methods can be unit testing techniques which force the code under test to exhibit potential errors. Then, the potential problems are fed to a flow and data analyses engine which performs backwards and/or forward analyses around the triggered space. The complexity of this flow or data analyses is in the order of $2^n$, where n is the number of lines of code in proximity of the trigger which should be examined. This analyses is much faster because in here the complexity of the analysis is in the order of 100 lines not 1,000,000 like in classical flow or data analyses. In other words, the invention applies a linear method of analyses for searching candidates for possible errors and then exponential method for filtering the false positive candidates for only the lines that are in proximity of the trigger (potential problem). This is an effective method for finding errors in computer programs, without actually executing them.

In one embodiment, the present invention is a software application for determining, storing and analyzing control flow graphs and/or data flow graphs and based on that, detecting possible defects. The software application includes: a language specific front end in a form of a source code parser, an intermediate language parser or the like. The software application also includes: an API for retrieving and representing important information about control flow, data flow, variables, types, functions, and the like; a scanner for scanning files in a project and retrieving required information to populate a repository using the API.

The repository is responsible for collecting information about files in a project. This repository is also responsible for optimizing the access to the information. An analyzer is the framework for various analyzing algorithms. A default algorithm uses rules from a variety of rule sets to recognize certain patterns in the flow graphs that violate the rules under enforcement. Other algorithms can be easily plugged in utilizing repository features for defects detection.

A software tool for rule creation, such as Rule Wizard™ from Parasoft™ Corporation which presents rules graphically, allows for rule customization and rule addition. Rules are stored in proprietary formats or open formats like, XML or UML. A Control User Interface (UI) drives scanning and analysis and provides configuration. A Presentation UI presents analysis results to the user.

FIG. 1 is an exemplary system diagram, according to one embodiment of the present invention. A language specific front end 114 analyzes files with source code, byte code, or intermediate language. For example, this can be a C++ parse tree 114a, a JAVA™ parse tree 114b, a .NET parse tree 114c, or any other language which can be represented as a parse tree. This front end also provides API implementation.

An API 112 retrieves information about control flow, data flow, variables, types, functions, and the like. A scanner 106 utilizes the API 112 to scan files 120 in a project and retrieves required information to populate a repository 102.

The repository 102 collects information about files 120 in a project. This repository is also responsible for optimization and accesses to the optimization information. For a better performance, a fast access to information like Control Flow Graphs (CFG) 130 and/or Data Flow Graphs (DFG) 134 for a given function, and all implementations of a given virtual function are provided.

An analyzer 108 is a framework for various analyzing processes. A default analyzing process uses rules from rules sets to recognize certain patterns in the flow graphs which violate rules under enforcement. Other processes can be easily plugged in utilizing the Repository features for defects detection.

A sets of rules 104 to be enforced by the analyzer 108 are available. A rule creation tool 110, such as Rule Wizard™ that presents rules graphically and allows for rules customization and addition can be used with the present invention. Created rules may be stored in a proprietary format or open format like, XML, UML, and the like.

In one embodiment, the repository includes:

A storage subsystem in the form of a relational database, hierarchical database, set of disc files, or other persistent storage mechanism.

An access optimization subsystem in the form of caches, indexes and so on for fast, optimized access to stored flow graphs, methods, types, etc.

A path creation subsystem which allows to expand graphs along function invocations so that the stored paths are elementary and the analyzer can further expand graphs on demand.

In one embodiment, the analyzer includes:

A basic framework for pluggable different processes.

Plugin applications with specific analysis algorithm implementations.

A flow graph walking subsystem, which can start at any point and walks through the execution path forward and/or backwards. The subsystem can on demand call the repository to expand flow graph traversed along function calls for more detailed analysis.

A pattern recognition subsystem (e.g., Rule Wizard™) capable to detect rule violations (patterns) along traversed execution path in either direction.

A path validation subsystem that is capable of validating whether a given path can be actually executed. This subsystem utilizes user hints, symbolic execution, path dumps from actual software executions as well as other possible sources of information.

A control User Interface (UI) 118 drives the scanning and analysis processes. The UI 118 also provides configuration for which rules to use, how large the paths need to be, place limit on the maximum time spent on the analysis, and the like. A presentation UI 116 presents analysis results to the users.

Additionally, FIG. 1 presents an exemplary notion of breaking larger execution units, like files with source code 120, into smaller parts, like methods and functions 124 and 126. Each such entity is then converted into control flow graph 130. Each element of control flow graph, which contains execution statements and variables 132, has a created corresponding data flow graph 134.

The following simplified example illustrates principles of static analysis of flow graphs. The example includes three classes, Main, SecurityRules, and DummySystem. The main function looks like:

```
public static void main(String[ ] args)
{
    DummySystem dummy=new DummySystem();
    String login=dummy.getParameter("login");
    String username=boo(login, 1) ? login: "invalid!";
    if (dummy.validateUser(username)) {
    dummy.setValid(true);
    } else {
    dummy.setValid(false);
    }
    dummy.run();
}
```

This function creates a dummy system object, then reads a "login" parameter. Then, a function is called with the parameter as an argument. Depending on a return value, another variable "username" is initialized to either "login" variable or some string constant. The dummy system object is then asked to validate user, based on the "username" variable. Depending on the validation result, the system is set to a valid user state or invalid user state. Finally, the system is started.

For this example, let's say that "validate User" is vulnerable to attacks and if some magic data, for example a string "tainted", is passed to the function, then unauthorized access is granted and sensitive data can be stolen. The "run" method only provides information about current system status.

String sensitiveData="Data secure!";

```
void run()
{
    if (_bIsValid) {
    System.out.println(sensitiveData);
    } else {
    System.out.println("No authorization!");
    }
}
boolean validateUser(String buffer)
{
    if (buffer=="tainted") {
    sensitiveData="Data stolen!";
    return true;//break in!
    }
    if (buffer=="demo") return true;//valid user.
    return false;
}
```

Figure 2:
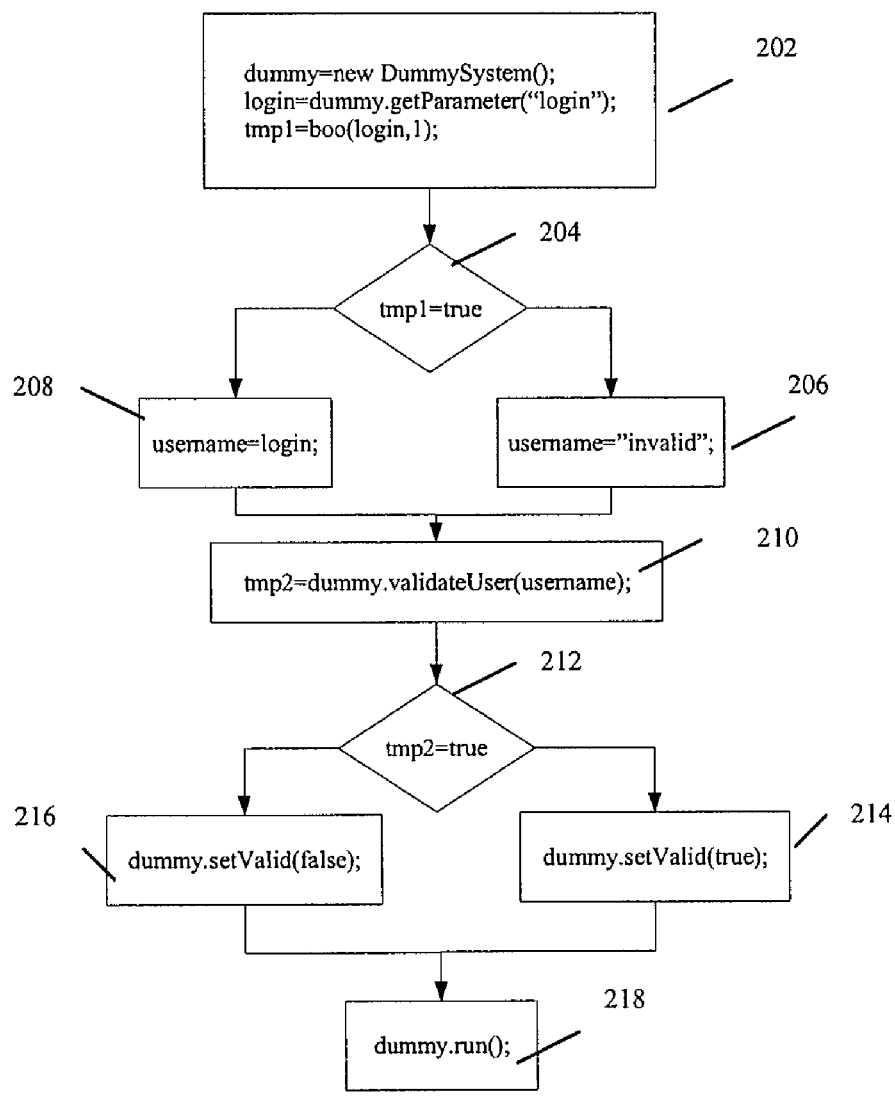
FIG. 2 is an exemplary flow graph for a "main" function.

The exemplary "main" function is now analyzed. The flow graph is depicted in FIG. 2. As shown, some basic block of expressions 202 are executed and then a decision point 204 is reached. Both branches 206 and 208 execute simple statements and then the flow merges at 210. There is also another decision point 212 and two more branches 214 and 216 that merge at 218.

Let's assume that the system includes a security rule, which requires:
1) validateUser is vulnerable to tainted input,
2) securityCheck can detect tainted data so it has to be called before validateUser always when data are suspected to be tainted, and
3) getParamater can return tainted data.

It is noted that "validateUser" is called with "username" variable as argument. Thus, to find out if the above security rule is complied with or violated, the analysis is performed from that point upwards. As shown in FIG. 2, there are two possible paths. Both paths include the first basic block 202, which in turn, includes "getParameter" function. Therefore, in a first rough approximation, one may conclude that both paths are potentially dangerous. For a closer analysis of both paths, a data flow graph of both paths are examined.

Figure 3:
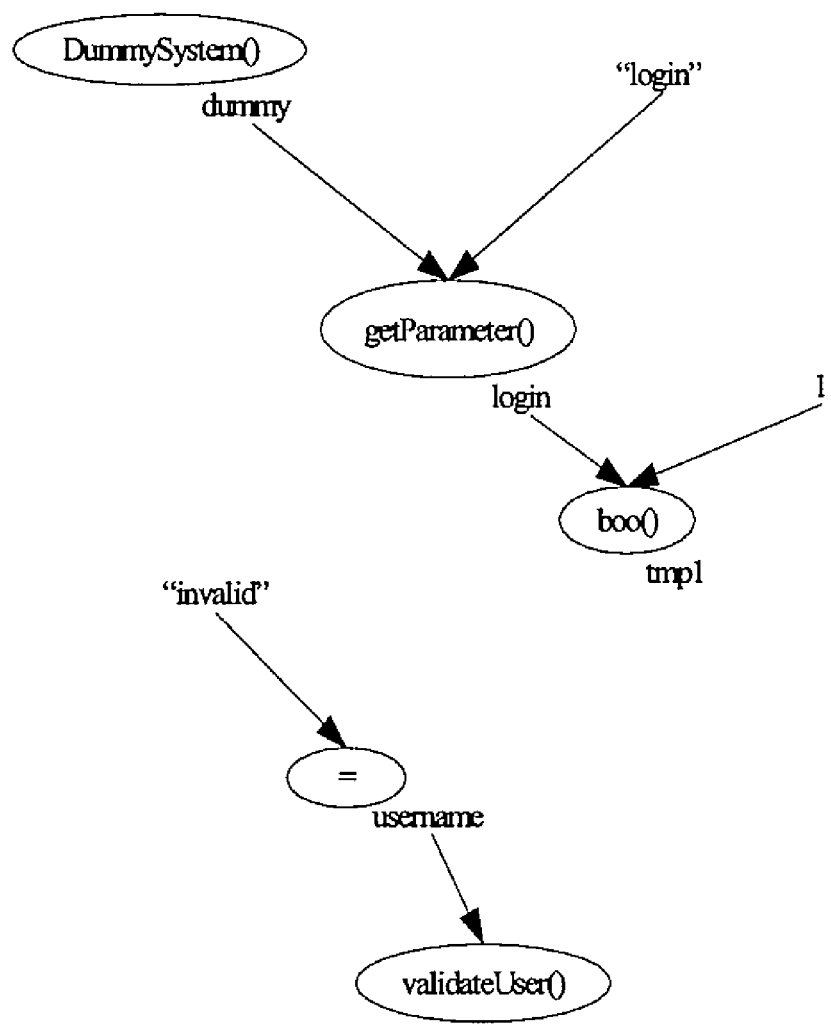
FIG. 3 is illustrates a data flow graph of the right path of flow graph of FIG. 2.

FIG. 3 illustrates the data flow graph of the right path of FIG. 2. As shown, there is no dependency between "username" variable passed as an argument to the "validate User" function, and possibly tainted data returned by "getParameter" function. As a result, this path can be removed from the analysis, as a safe path.

Figure 4:
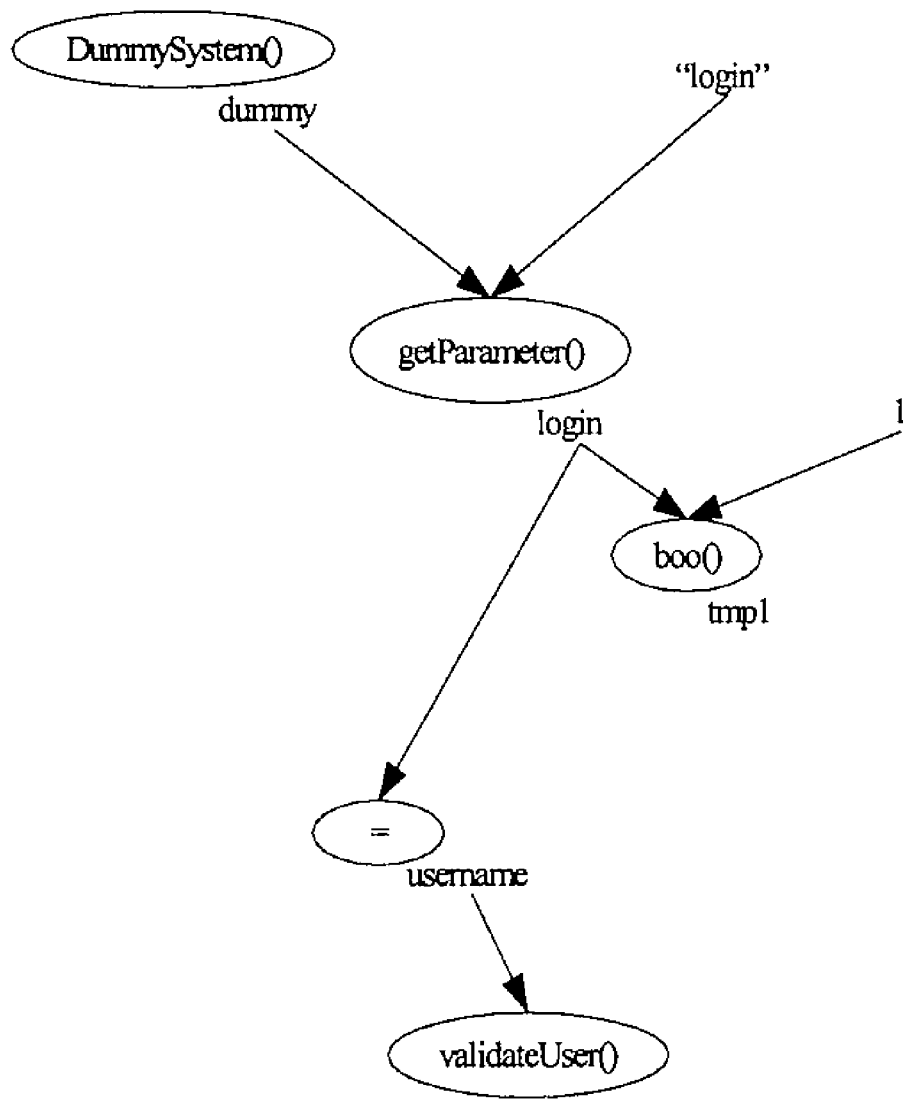
FIG. 4 is illustrates a data flow graph of the left path of flow graph of FIG. 2.

FIG. 4 illustrates the data flow graph of the left path of FIG. 2. This time, there is a direct dependency between the value returned from "getParameter" and an argument passed to "validateUser". Since there is no invocation of "securityCheck" in between, this path is flagged as a security rule violation. However the analysis does not stop here. As shown in the flow diagram, the potentially dangerous path can be taken only if "boo" function returns "true". The "boo" function includes:

```
static boolean boo(String buffer, int type)
{
    boolean result=false;
    if (buffer !=null)
    {
    SecurityRules sec=new SecurityRules();
    result=sec.securityCheck(buffer, type);
    }
    return result;
}
```

Analyzing the code of this function, demonstrates that the function can only return true when lines inside "if" statement are executed and in this case return result is taken directly from "securityCheck" function call. In other words, this path is potentially dangerous, but will never be taken if "securityCheck" is not performed or when it returns false. However, to determine this fact, having only pure control flow graph or data flow graph is not sufficient.

Figure 5:
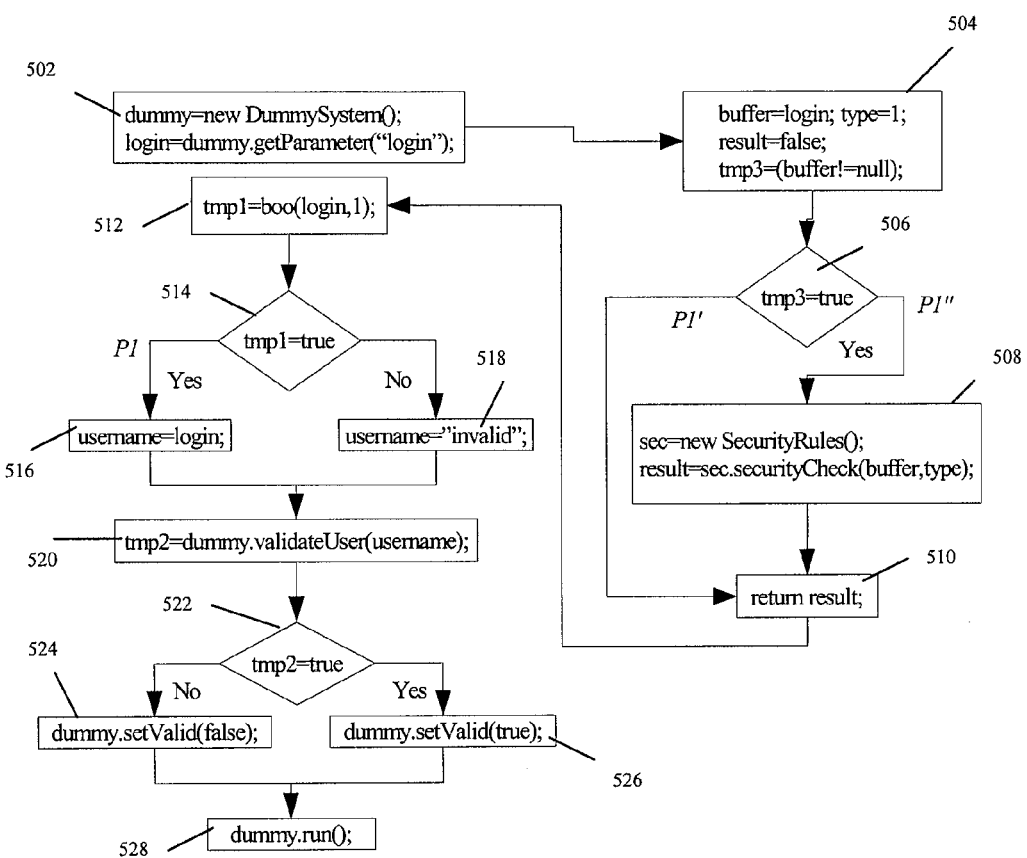
FIG. 5 depicts a flow graph expanding an exemplary "boo" function.
Figure 6:
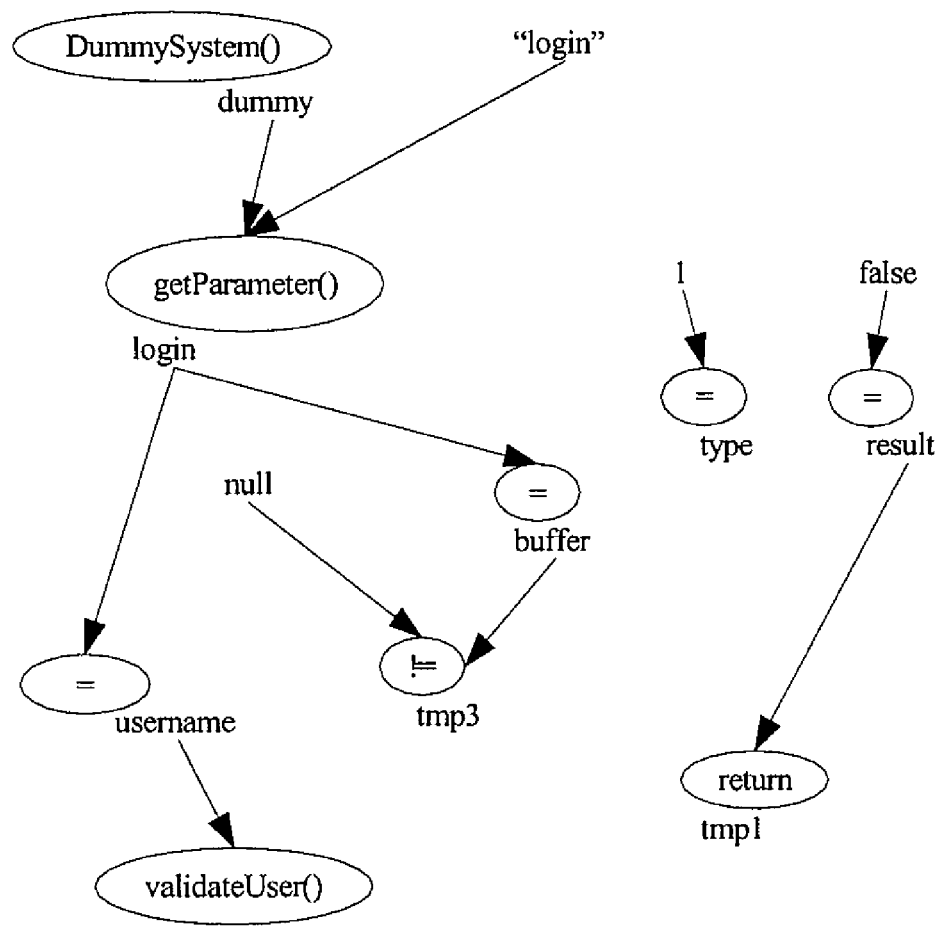
FIG. 6 illustrates a data flow diagram for P1' path of FIG. 5.

FIG. 5 depicts a flow graph expanding the "boo" function. The path of interest can be expanded into paths P1' and P1". For P1' path data flow diagram looks like FIG. 6.

As shown in the data flow diagram, a value returned from "getParameter" is still passed to "validate User" function. This is because the diagram shows pure data dependencies and does not take into account the fact that P1 is traversed only when "boo" returns true, which will never happen on P1' path. To determine this fact, the boolean expressions, which determine which path is taken at the decision point 506 need to be evaluated.

Execution starts with creation of dummy system object and method "getParameter" call 502. Then, execution of "boo" method begins (504) until a decision point is reached in block 506. Depending on the decision, security check can be performed in block 508 and the result is returned in block 510. Execution continues in block 512 and another decision point is reached in block 514. Depending on the decision, block 516 or block 518 is then executed. Subsequently, both execution paths meet in block 520 and another decision point is reached in block 522. Depending on the decision, a "setValid" method is called with either a "false" argument (524) or a "true" argument (526). Execution then continues in block 528.

In this particular example, those expressions are simple and thus relatively simple to be evaluated. However, in general cases, the expressions can involve arithmetical expressions and function calls for which the code is not available and thus flow information is not available. Consequently, without actually executing the code, it can be difficult to filter out such false positive as P1' path. Assuming that P1' path can be somehow filtered out, the data flow graph for path P1" is shown in FIG. 7.

Figure 7:
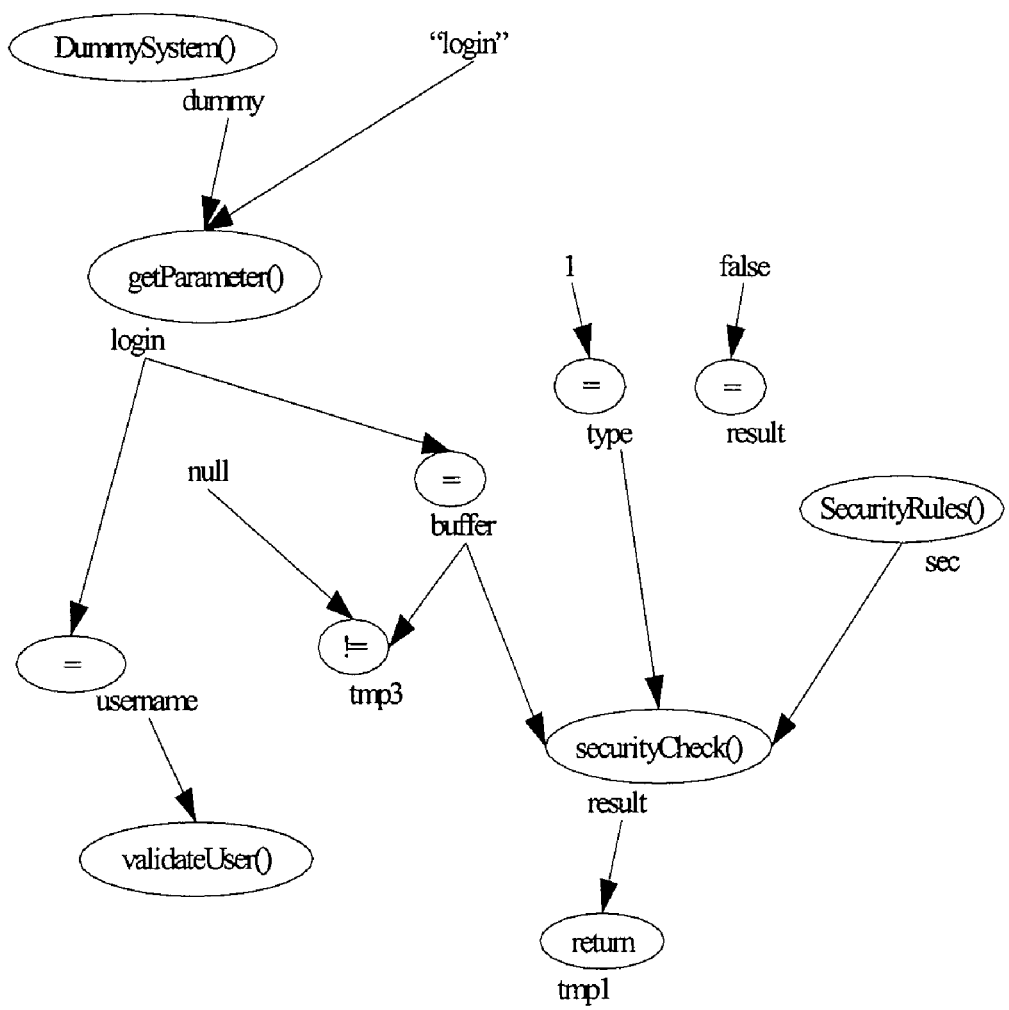
FIG. 7 illustrates a data flow diagram for P1" path of FIG. 5.

It can be seen from FIG. 7 that the "securityCheck" is performed in data flow and that the suspected data is passed to it as an argument. Knowing the order of the execution, one can further notice that this call is completed before suspicious data is passed to "validateUser" function. Therefore, this path can be considered as safe. However, let's assume that there is a bug in the function and the "boo" function always returns true disregarding the value obtained from the "securityCheck". The code corresponding to the above scenario may look like:

static boolean boo(String buffer, int type)
{
   boolean result=false;
   if (buffer !=null)
   {
   SecurityRules sec=new SecurityRules();
   sec.securityCheck(buffer, type);
   result=true;
   }
   return result;
}

Figure 8:
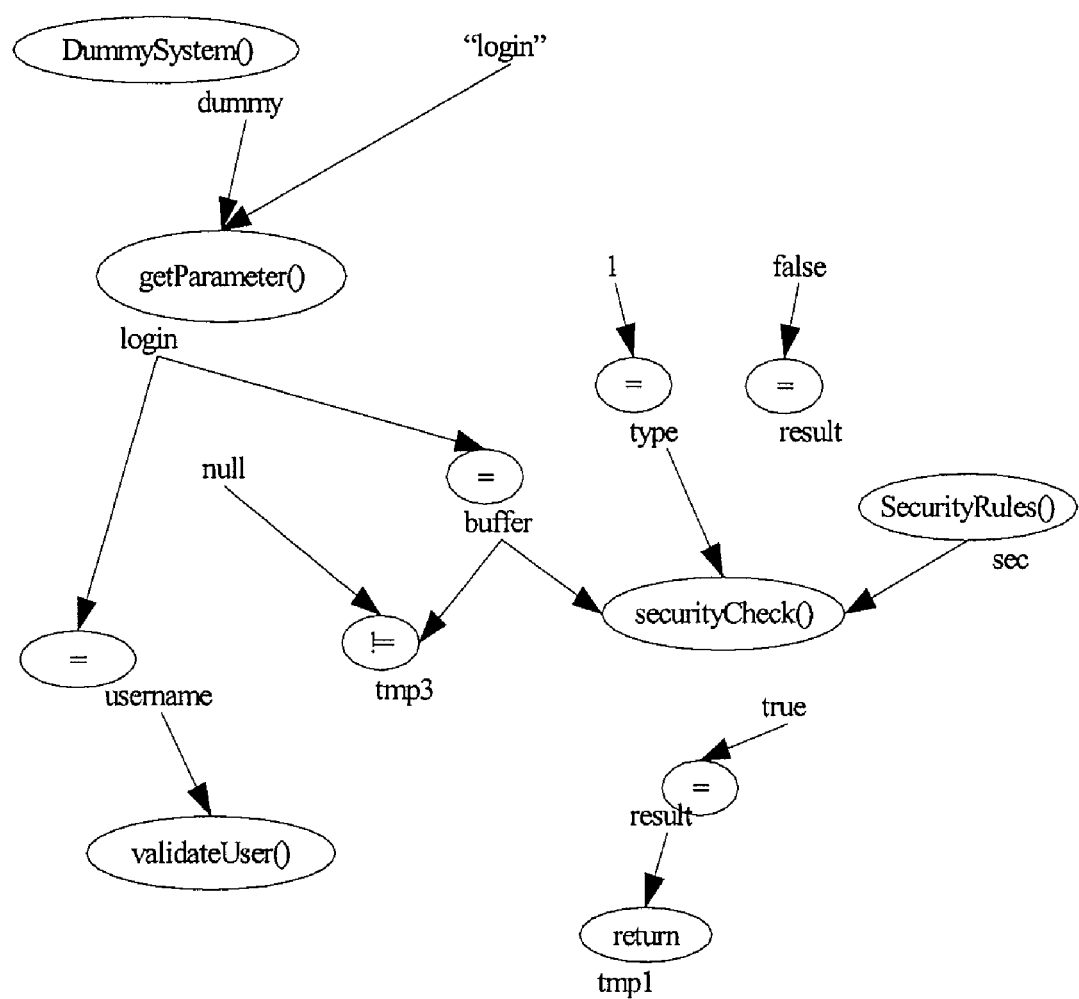
FIG. 8 illustrates a data flow diagram for P1" path of FIG. 5, and modified to incorporate a defect described in a text.

In such a case, the flow diagram changes slightly, as shown in FIG. 8. That is, the return value is independent from results of securityCheck method and is always true.

All the statements made about the previous diagram are also true for this diagram, that is, "securityCheck" is involved, suspicious data are passed to it and it is executed before "validate User". But this time, "validateUser" is not protected because the result from securityCheck does not influence decision point, and path P1" is also traversed for tainted data.

As can be seen from the simplified example described above, static flow analysis has some limitations in correctly identifying actual code defects. However, static flow analysis has some significant advantages over other techniques for detecting software defects. First, it is static and thus does not require actual execution. This means that it is much easier for a person (e.g., a tester) to run static flow analysis than dynamic analysis. As such, no special testing environment needs to be prepared. For example, a web application usually requires web a application server to run on and a database to store persistent information in. Static analysis overcomes this burden because actually no code is being executed. Static analysis instead, analyzes potential execution scenarios.

Another benefit of performing static analysis is that static analysis usually covers 100% of the code. In flow analysis case still 100% of the code lines may be covered, however, execution paths are built only up to certain accuracy. In contrast, dynamic analysis usually has a smaller coverage than static analysis. Tests on an application level and closest to real life situations, usually cover 20%-30% of the code in larger applications. Using unit testing techniques, one may achieve much more, sometimes even up to 100%. However, the higher coverage requires manually adjusting test cases to increase coverage, which consumes a significant development time.

Another advantage of static flow analysis comes from the fact that it simulates execution scenarios. Other static analysis, like coding standards, have significant limitations in defects detection. They are usually limited to analyzing one function or method and one execution block, at a time, as far as execution related defects are considered. Also, these analysis are performed one file at a time. On the contrary, flow analysis does not have such limitations. To illustrate how this influence defect detection capabilities let's consider a rule which states that every stream explicitly open should be prolixity's closed. If stream creation and closure are in the same method, one can use coding standards analyzer and look if in one function there is the same number of stream creations and closures. But, what if the stream is created by one class, for a given file, but closed by another file that is located in a different file? Coding standards analysis is unable to handle such situations. However, the present invention uses a global repository and thus it does not matter in which file a given execution block is located. In one embodiment, all that matters for the present invention is whether a stream variable created by one piece of code is eventually closed by another.

Figure 9A:
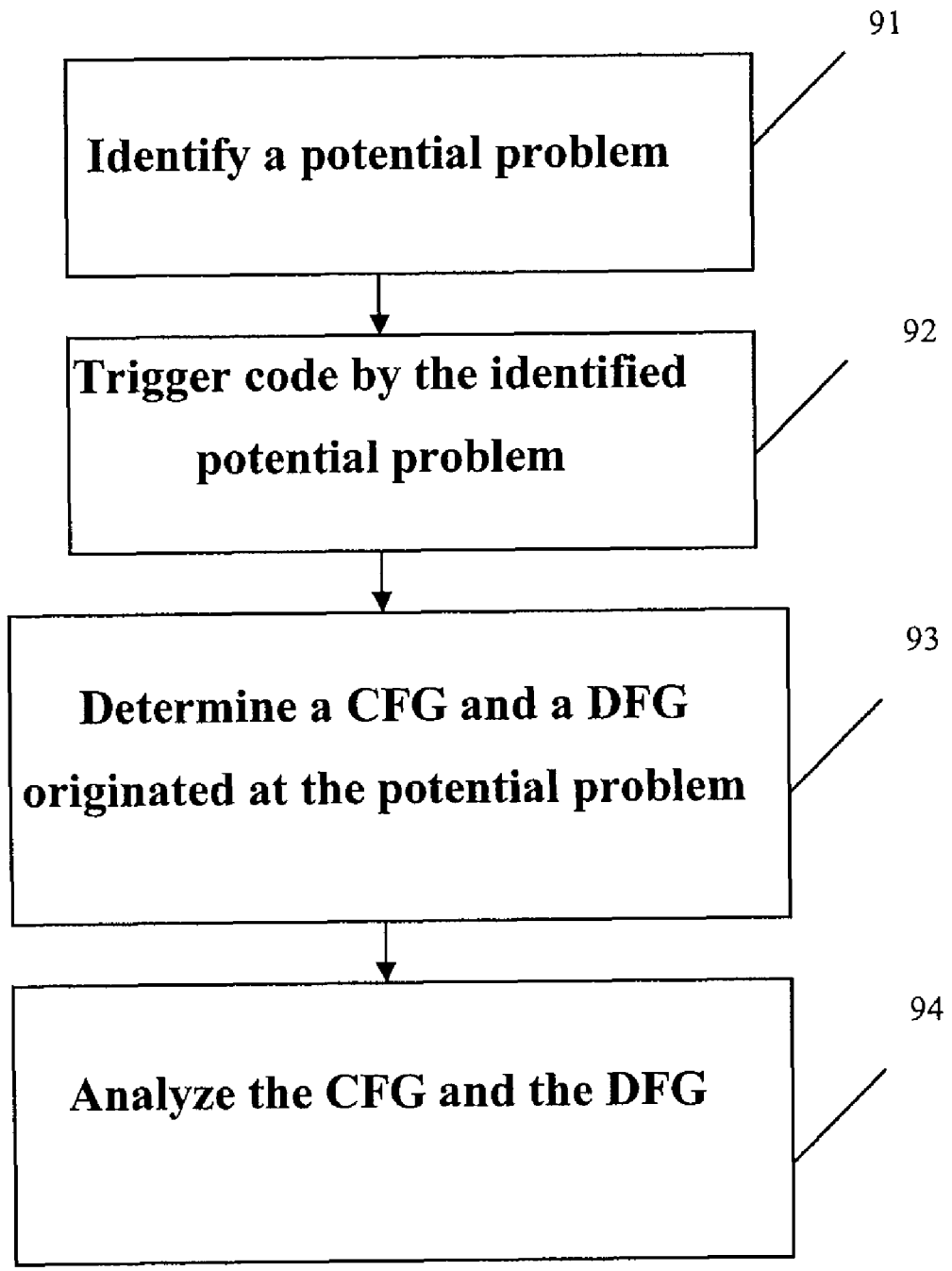
FIG. 9A depicts an exemplary process flow diagram, according to one embodiment of the present invention.

FIG. 9A shows an exemplary process flow diagram, according to one embodiment of the present invention. As shown, in block 91, a potential problem is identified in the computer software. This potential problem then needs to be verified as an actual error in the code by determining whether it is a false positive or a false negative problem. The potential problem may be identified by executing test tools, such as unit testing or static analysis tests, on the entire or a portion of the computer software. Alternatively, or in combination, the potential problem may be identified as a line of code in the program at which the program crashes. Other methods known in the art may also be used to identify the potential problem.

In block 92, a relevant portion of the program is triggered by the potential problem. The triggering tool returns the node or line number where the possible problem can exist. In case of static code checker, line number may be printed. In case of unit testing tool, the line number of possible error may be reported as exception. CFG and DFG graphs are generated originating at the identified potential problem, as shown in block 93. Various methods for generating the CFG and DFG graphs as explained in detail below. In block 94, the generated CFG and DFG graphs are analyzed to verify whether the identified potential problem is an actual error, that is, not a false positive. For example, the CFG and DFG graphs are back-tracked and/or forward-tracked from the identified potential problem. This way, the complexity of data and control analysis is in the order of N, where N is the number of lines of code, instead of being in the order of $2^N$ in case of conventional data and control analysis methods.

Figure 9B:
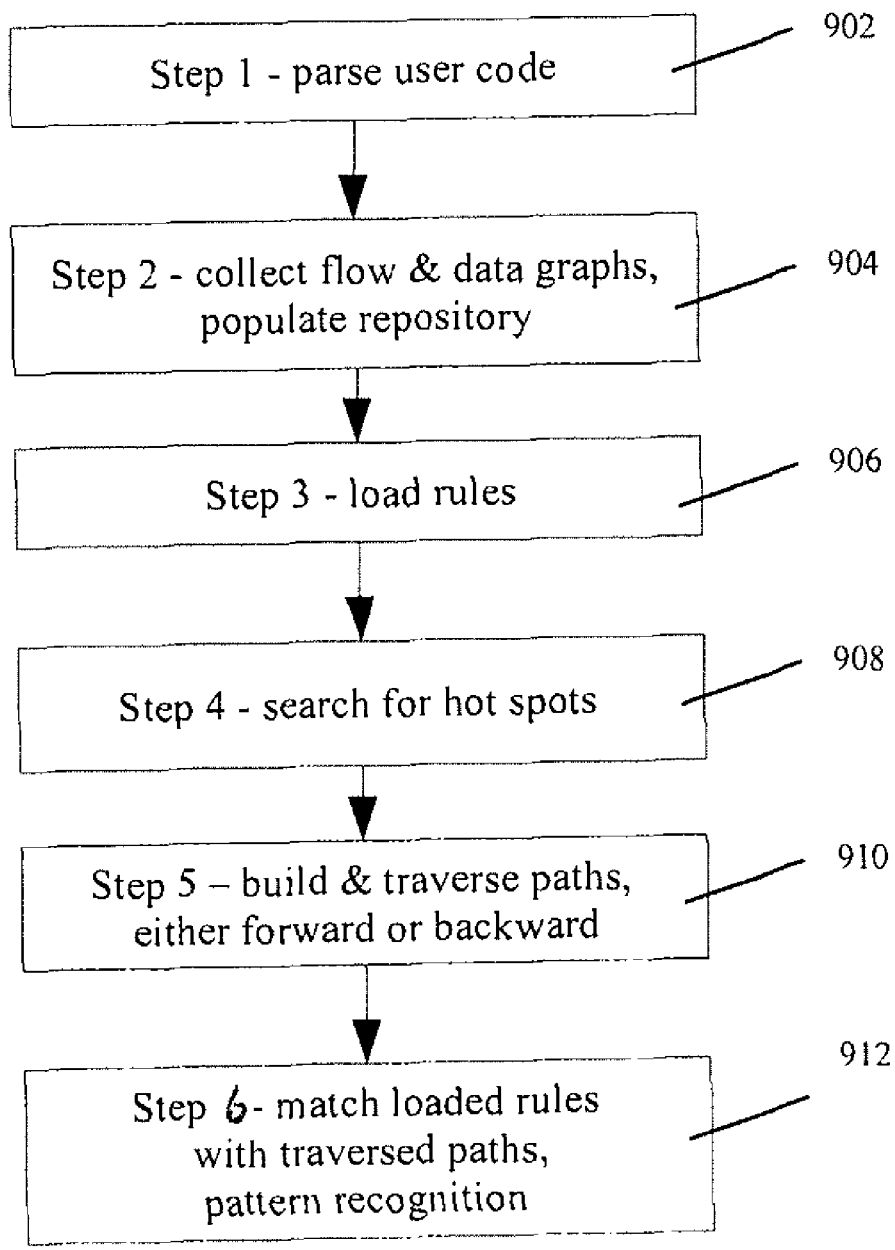
FIG. 9B illustrates an exemplary process flow diagram, according to one embodiment of the present invention.
Figure 10:
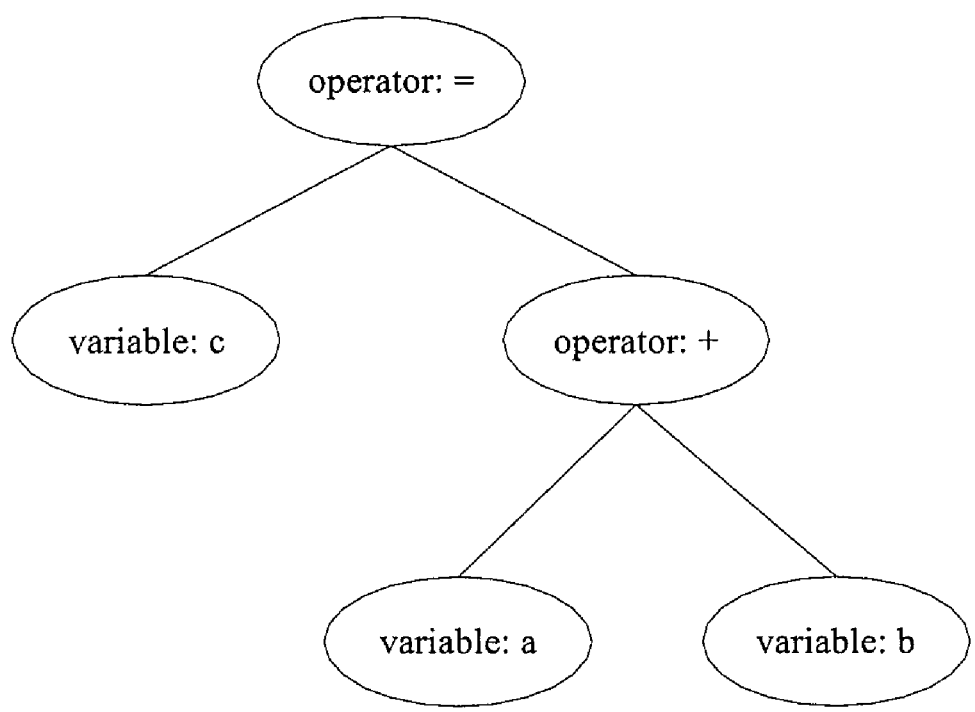
FIG. 10 is a graph fragment for an expression "c=a+b"

FIG. 9B illustrates an exemplary process flow diagram, according to one embodiment of the present invention. As shown, in block 902, the user code is parsed. An appropriate front end compiler scans the source code and parses it to create a parse tree. The parse tree is a graph including nodes that are language specific tokens. For example, an expression "c=a+b" could be represented in a parse tree as the graph fragment, shown in FIG. 10.

Custom code, other vendors compiler, and the like, may be used to obtain parse tree. The present invention translates this parse tree into an appropriate flow diagram. For the above example, it would be a basic block representing continuous execution path. However, for effective operation, direct relation to the original source code as well as detailed information about execution elements need to be preserved and made available to the analyzing algorithm. Direct relation to the original source code is needed to properly present detected defects to the user, providing source file names and lines involved. The detailed information about execution elements is needed for symbolic execution to validate paths traversed.

As shown in block 904, the flow and data graphs are collected and the repository is populated. In one embodiment, the scanner uses API to collect information about elements of the code under analysis. This includes information about functions and other execution blocks. For the execution blocks, the scanner retrieves flow and data graphs and populates the repository with them.

Figure 11:
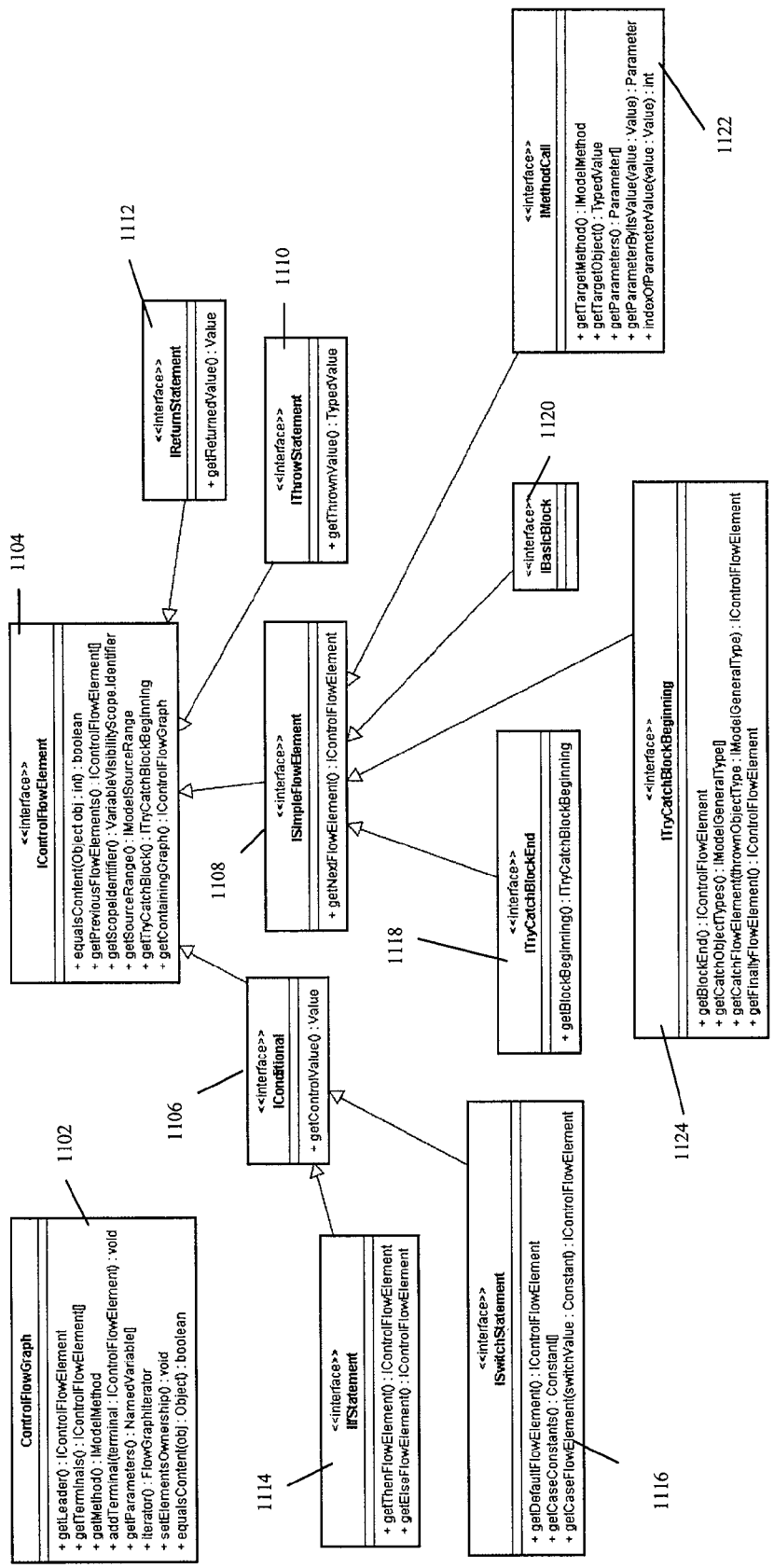
FIG. 11 is an UML diagram for sample flow graph elements.

Sample flow graph elements are presented on an UML diagram shown in FIG. 11. In one embodiment, the control flow elements 1104 represent basic blocks of execution such as, control flow graphs 1102, conditional statements 1106, simple flow elements 1108, throw statements 1110, return statements 1112, if statements 114, switch statements 1116, try/catch blocks 118 & 1124, basic blocks 1120, method calls 1122, and the like. Other implementations can apply as well.

Referring back to FIG. 9B, in block 906, the rules are loaded. In one embodiment, the analyzer loads rules to be analyzed into a memory. The rules may be represented externally (user visible) as XML, serialized JAVA™ classes, some binary format, or pieces of code stored in some library. Ultimately, this step prepares and activates a set of rules to be analyzed in a form appropriate for a given process/implementation.

In one embodiment, the invention utilizes finite state automate concept for defect detection. However, this is not the only concept utilized by the present invention, other methods such as symbolic execution simulation and the like can also be utilized to detect defects. For the finite state automate concept, rules are structured into several fragments. Each fragment falls into one of three categories: initialization, propagation and assertion. A rule also defines states, which can be assigned to program entities. Rule structure details are presented below. The rules parts are created by feeding the examples of the code which represents the program entity into test tools such as RuleWizard™. The test tool then creates a parse tree which represents the sniplet of the code. Then the parse tree can be automatically transformed to the rule fragment.

In one embodiment, each rule is characterized by a set of states. A state is represented by an ASCII string. In addition to states, the rule has fragments, which describe actions such as, initialization of a state, propagation of a state, and/or state assertions. States are used to describe life cycle of program entities during program execution. For example, a common case describes state of a variable. For instance, a variable of object type can be described as initialized (it will have state of initialized then) on path fragments where it has non-null value, and as uninitialized there where it has null value.

Assertion rule fragments state conditions stipulated by the rule. A rule violation occur if the condition expressed in an assertion is contradictory to the actual situation for some execution path in the program. Conditions are expressed by means of elements which can be matched to language elements (variables, method calls etc) and states which are asserted. For example, a variable of object type must be in initialized state if a method call is performed on it.

String sName=null;
sName.trim(); <--sName must be initialized here

Figure 12:
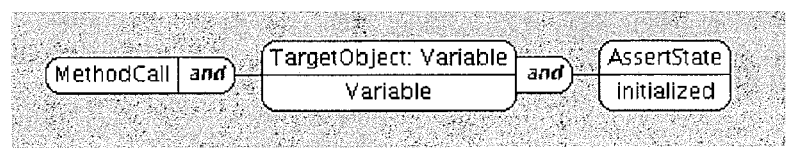
FIG. 12 is an exemplary assertion rule fragment.

A corresponding assertion rule fragment is depicted in FIG. 12. One can identify an element which represents a method call. Whenever a method call is identified, then the target object is analyzed. If it is a variable, it's state is checked for being "initialized". These three steps are represent by consecutive "rounded blockes" in FIG. 12.

Initialization rule fragments represent patterns upon matching of which states of some entities get set. In the above example, the object variable gets initialized state in definition statements when right hand side is constant, initialized variable or expression involving constant or initialized variable. Sample cases are shown below.

Figure 13:
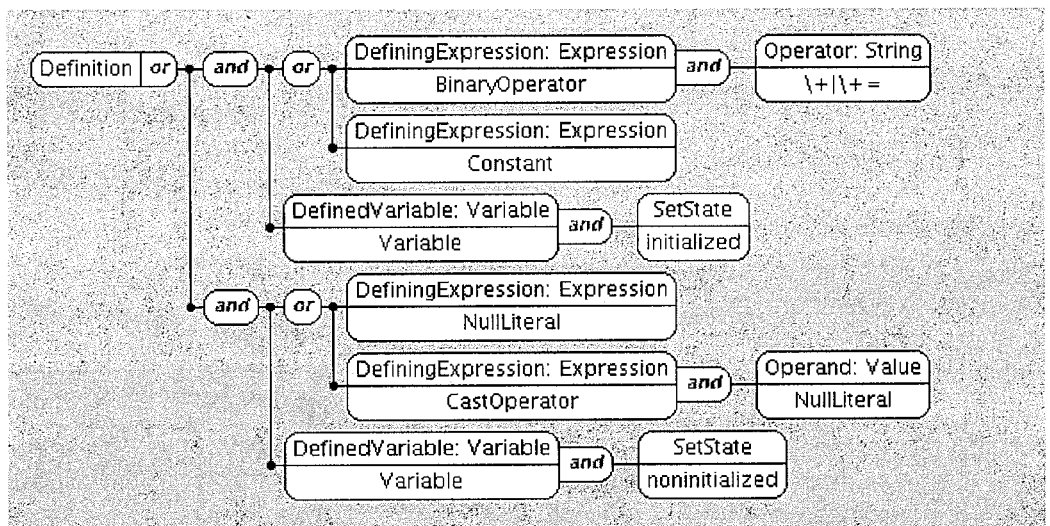
FIG. 13 is an exemplary initialization rule fragment.

String sName+= "a";//gets "initialized" here
String sName="foo";//gets "initialized" here
String sName=null;//gets "noninitialized" here
String sName=(String)null;//gets "noninitialized" here A corresponding initialization rule fragment is depicted in FIG. 13. Root node of the rule fragment represents definition expression. Two branches are possible. First branch covers first and second line above, when the state of the resulting variable is "initialized". In such a case, defining expression is either constant or binary operator "+" or "+=". Second branch covers third and fourth line above, when the state of the resulting variable is "uninitialized". In such a case, defining expression is either null literal, cast operator to null literal, or variable with a state "noninitialized".

Propagations express patterns which determine propagation of states from one entities to others. They are similar to initialization rule fragments. Actually in many practical cases, propagation patters and initialization patterns are merged into initialization patterns. For example, the initialization example above already covers propagation.

String sName+=sLastName;//propagates state of sLastName

A sample graphical rule representation is presented above. In one embodiment, states which characterize rule could be represented as following XML fragment:

```
<States>
<State>initialized</State>
<State>not initialized</State>
</States>
```

Rule fragments, like assertions could be represent in a following way:

```
<Assertion>
<Match type="Node" value="MethodCall">
<Property name="TargetObject: Value" type="Node">
<StateCommand type="assert">
   <State ref="initialized"/>
</StateCommand>
</Property>
</Match>
</Assertion>
```

In this example, assertion rule fragment asserts state "initialized" on target object of method call (compare assertions example above).

Referring back to FIG. 9B, a search for hot spots is performed in block 908. The analyzer searches the repository for hot spots. Here, hot spots are the statements that may experience flow analysis rule violation. For example, using a rule for making sure that object variables are initialized before use, a hot spot is a method call on a given object. Therefore, whenever a method call is encountered in a program, it is a potential hot spot. An object variable is registered as one which needs to be watched, before analysis begin.

String sName=null;
sName.trim(); <--hot spot

In block 910, the paths are built and traversed forward or backward. The invention starts from a hot spot and starts building execution paths forward or backward, depending on what is appropriate for a given rule and algorithm. Additionally, the system registers the variables that need to be watched, based on built-in implicit propagation rules for watching variables. Let's consider an example below:

```
class Foo {
public String_s=null;
Foo(String s) {
   _s=s;
}
...
Foo foo("aaa");
String name=foo._s;
name.trim();
...
```

A hot spot for the above exemplary rule is "name.trim()" where variable name of type String is de-referenced. The system finds the hot spot and then decides that variable "name" needs to be watched during path traversal. However, one line above system detects, that variable name is initialized from variable _s, which is internal variable of object foo of class Foo. The system from that point realizes that instead of variable name a variable "foo._s" must be watched.

In one embodiment, paths are created on demand by a path builder and cached for performance reasons. The path builder is a subsystem responsible for creating paths for the analysis. Depending on the rule, the corresponding path is traversed/created backwards or forwards. Path builder takes an element of control flow graph and can provide a list of next/previous elements, which can be accessed from a given element by execution flow. A simple case is a linear block of statements.

For a given element, there is one previous and one following element (statement). Conditional statements can have several next elements. However, in a more complicated situation; when during backward path building a beginning of method is reached, the path builder examines repository to determine all places in a code where given method can be potentially called. Then, the path builder continues building paths. Also, when a try-catch construct is analyzed, all places where exception can be thrown and caught by a given catch statement need to be determined and considered as possible paths.

When in an execution block, a method call is detected, the path builder builds a path which goes inside the method ("enroll" method). However, it is up to the algorithm and the rule to decide whether path builder should enroll method call or not. If the method call cannot influence variables under watch, enrolling the method may not be required. Avoiding unnecessary traversal of called methods bodies is one of important optimization elements of the system, which may be crucial for system application feasibility.

Referring back to FIG. 9, in block 912, the loaded rules are matched with traversed paths, that is a pattern recognition process is performed. To match loaded rules or rule fragments with an actual fragment of execution path, the system creates so called "matchers" for each rule element (denoted as a single "block" in graphical rule representation described in relation to block 906). Matchers take given elements from a path and determine whether rule fragments are matched.

In one embodiment, matchers work on finer granularity than just control flow graphs. For example, it is not sufficient to know that a given piece of code has linear control flow without branches. It is also important to understand how values propagate among variables inside the piece of code. For that purpose, the system divides larger control flow blocks into finer ones, for example, representing single statement. The system uses parse tree information as well as data flow graphs for that purpose (to obtain all variable definitions from the latter).

In one embodiment, matchers have a tree-like structure. A top level matcher is called "head matcher". If a head matcher does not match to the given flow element, the rest of the matchers are not consulted (child matchers). Otherwise, all child matchers are consulted. For example, if assertion rule fragment states that in a method call, the target object needs to be initialized, general matching algorithm performed the following exemplary steps:

1. Head matcher matches for control flow element representing method call.
2. Once this is matched, child matcher extracts the target object from the method call from the path.
3. If target object is variable, another matcher is activated which checks for variable state.

In one embodiment, matchers can be specialized for types of elements, which need to be matched between analyzed path elements and rule elements. For example, a head matcher matches rule elements to control flow elements, that is, a "control flow element matcher". A logical matcher represents "and" or "or" operation from a rule. It returns true if all or one of child matchers return a positive match, which itself do not match to any path element. A property matcher matches given properties of flow elements. For example, method called can have a property "target object" or "method name".

When traversing execution paths backwards, the process first matches assertion rule fragments. The process collects and keeps track of matched assertion rule fragments in the analyzed path (assertions), states which are asserted, and objects that should have asserted states. Then, while traversing execution path, propagation rule fragments if matched help to determine what objects and states need to be kept track of. Finally, an initialization rule fragment is matched and the assigned state is compared with the asserted state. If states are different, the rule is violated and defect is found.

During a forward traverse of the execution path, the situation is the opposite of the above. That is, the process starts from matching initialization rule fragments. Then, the process traverses execution path. If matched, propagation rule fragments help to determine what objects get certain states. Finally, when the assertion rule fragment is matched and the asserted state is different, then the rule is considered to be violated and defect is found. More details on different matching processes is described in U.S. Pat. No. 6,473,896; the entire content of which is hereby incorporated by reference.

It will be recognized by those skilled in the art that various modifications may be made to the illustrated and other embodiments of the invention described above, without departing from the broad inventive scope thereof. It will be understood therefore that the invention is not limited to the particular embodiments or arrangements disclosed, but is rather intended to cover any changes, adaptations or modifications which are within the scope and spirit of the invention as defined by the appended claims.

What is claimed is:

1. A method for identifying errors in computer software, the method comprising:
   executing one or more test tools to identify a potential problem in the computer software;
   electronically identifying a portion of the computer software affected by the identified potential problem;
   electronically determining a control flow graph and a data flow graph for the affected portion of the computer software originating at the identified potential problem;

electronically back-tracking and forward-tracking the control flow graph and the data flow graph to verify that the identified potential problem is an actual error; and providing configuration for how large the control flow graph and a data flow graph need to be, and limit on the maximum time spent on verifying that the identified potential problem is an actual error.

2. The method of claim 1, wherein the executing one or more test tools comprises analyzing the computer software by a static analysis software tool.

3. The method of claim 1, wherein the executing one or more test tools comprises analyzing the computer software by a unit test software tool.

4. The method of claim 1, wherein the executing one or more test tools comprises executing the computer software by the one or more test tools and determining a line of code in the computer software at which the computer software crashes.

5. The method of claim 1, wherein the determining a control flow graph and a data flow graph comprises parsing the affected portion of the computer software and creating a parse tree.

6. The method of claim 1, wherein the analyzing the control flow graph and the data flow graph has a complexity proportional to N, where N is an integer number of lines of code in the computer software.

7. The method of claim 1, wherein the back-tracking comprises keeping track of sequence of patterns in the triggered portion of the computer software.

8. The method of claim 1, further comprising matching a set of rules with the control flow graph and the data flow graph.

9. The method of claim 1, further comprising analyzing the affected portion of the computer software by a static analysis software tool.

10. A method for identifying errors in computer software, the method comprising:

triggering a portion of the computer software by a trigger;

electronically determining a control flow graph and a data flow graph for the triggered portion;

executing a set of rules along the determined control flow graph and the data flow graph to keep track of sequence of patterns in the control flow graph and the data flow graph;

statically simulating the triggered portion; and providing configuration for which rules to use, how large the control flow graph and a data flow graph need to be, and limit on the maximum time spent on identifying said errors.

11. The method of claim 10, wherein the set of rules are created using code sniplets.

12. The method of claim 10, wherein the trigger is a potential problem in the computer software.

13. The method of claim 12, wherein the potential problem is identified by testing the computer software by a test tool.

14. The method of claim 10, wherein the determining a control flow graph and a data flow graph comprises parsing the triggered portion of the computer software and creating a parse tree.

15. A system for identifying errors in a computer software comprising:

means for executing one or more test tools to identify a potential problem in the computer software;

means for identifying a portion of the computer software affected by the identified potential problem;

means for determining a control flow graph and a data flow graph for the affected portion of the computer software originating at the identified potential problem;

means for-back-tracking and forward-tracking the control flow graph and the data flow graph to verify that the identified potential problem is an actual error; and means for providing configuration for how large the control flow graph and a data flow graph need to be, and limit on the maximum time spent on verifying that the identified potential problem is an actual error.

16. The system of claim 15, wherein said one or more test tools comprises a static analysis software tool.

17. The system of claim 15, wherein said one or more test tools comprises a unit test software tool.

18. The system of claim 15, wherein means for determining a control flow graph and a data flow graph comprises means for parsing the affected portion of the computer software and creating a parse tree.

19. A system for identifying errors in a computer software comprising:

means for triggering a portion of the computer software by a trigger;

means for determining a control flow graph and a data flow graph for the triggered portion;

means for executing a set of rules along the determined control flow graph and the data flow graph to keep track of sequence of patterns in the control flow graph and the data flow graph;

means for statically simulating the triggered portion; and means for providing configuration for which rules to use, how large the control flow graph and a data flow graph need to be, and limit on the maximum time spent on identifying said errors.

20. The system of claim 19, wherein the set of rules are created using code sniplets.

21. The system of claim 19, wherein the trigger is a potential problem in the computer software.

* * * * *